(12) United States Patent
Takano et al.

(10) Patent No.: US 8,050,314 B2
(45) Date of Patent: Nov. 1, 2011

(54) APPARATUS AND METHOD FOR WIRELESS COMMUNICATION, AND COMPUTER PROGRAM

(75) Inventors: Hiroaki Takano, Saitama (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 282 days.

(21) Appl. No.: 12/482,798

(22) Filed: Jun. 11, 2009

(65) Prior Publication Data

US 2010/0020857 A1    Jan. 28, 2010

(30) Foreign Application Priority Data

Jul. 23, 2008 (JP) ................ 2008-189343

(51) Int. Cl.
*H04B 1/38* (2006.01)
*H04L 5/16* (2006.01)
(52) U.S. Cl. ........ 375/219; 375/267; 375/295; 375/347; 375/349; 455/100; 455/103; 455/500; 455/526
(58) Field of Classification Search .......... 375/219, 375/267, 295, 347, 349; 455/100, 103, 500, 455/526
See application file for complete search history.

(56) References Cited

U.S. PATENT DOCUMENTS 7,392,015 B1 * 6/2008 Farlow et al. .............. 455/67.11

FOREIGN PATENT DOCUMENTS

| JP | 2005-348236 | 12/2005 |
|---|---|---|
| JP | 2007-116489 | 5/2007 |
| WO | WO 00/60757 | 10/2000 |

OTHER PUBLICATIONS

U.S. Appl. No. 12/474,710, filed May 29, 2009, Takano, et al.

* cited by examiner

*Primary Examiner* — Curtis Odom
(74) *Attorney, Agent, or Firm* — Oblon, Spivak, McClelland, Maier & Neustadt, L.L.P.

(57) ABSTRACT

A wireless communication apparatus includes a plurality of antenna branches for transmitting and receiving a wireless communication signal, a calibration coefficient calculator for calculating a calibration coefficient for each frequency band, the calibration coefficient correcting an imbalance in phase and amplitude existing between the antenna branches, a coefficient storage memory for storing the calibration coefficient of each frequency band, a calibration coefficient reader for reading the calibration coefficient of a frequency band of one of a transmission signal and a reception signal as a target to be calibrated, a calibration coefficient interpolator for interpolating a calibration coefficient of the frequency band if the coefficient storage memory stores no corresponding calibration coefficient of the frequency band, and a calibration coefficient multiplier for multiplying one of the transmission signal and the reception signal by one of the read calibration coefficient and the interpolated calibration coefficient.

7 Claims, 7 Drawing Sheets

APPARATUS AND METHOD FOR WIRELESS COMMUNICATION, AND COMPUTER PROGRAM

BACKGROUND OF THE INVENTION

1. Field of the Invention

The present invention relates to a wireless communication apparatus, a wireless communication method, and a computer program for performing an antenna calibration process compensating an imbalance in phase and amplitude present between antenna branches of a plurality of antennas. More specifically, the present invention relates to a wireless communication apparatus, a wireless communication method, and a computer program for performing the calibration process on the antenna branches in a communication system handling a wide-band signal.

The present invention also relates to a wireless communication apparatus, a wireless communication method, and a computer program for performing the calibration process on the antenna branches in a wide-band communication system, such as an orthogonal frequency division multiplexing (OFDM) system, which divides a wide-band signal into a plurality of sub-carriers. In particular, the present invention relates to a wireless communication apparatus, a wireless communication method, and a computer program for performing the calibration process on the antenna branches in a wide-band communication system that uses a plurality of packet formats different in the sub-carrier placement on a frequency axis as defined in the IEEE802.11n standard.

2. Description of the Related Art

A wireless network draws attention as a system that is free from wiring in wired communication method in the related art. Standards available for wireless network are the Institute of Electrical and Electronic Engineers (IEEE) 802.11 and IEEE802.15. For example, IEEE802.11a/g as wireless LAN standard adopts multi-carrier OFDM modulation method. The IEEE802.11a/g standard supports a communication system of up to a communication speed of 54 Mbps. There is a need for a next-generation wireless LAN standard that can achieve an even higher bit rate.

A multi-antenna technique may be available as a wireless communication technique to achieve a high-throughput wireless data transmission. In the multi-antenna technique, a communication apparatus works on a plurality of antennas. An adaptive array antenna is widely known as a multi-antenna technique. The adaptive array antenna supports communications by controlling a gain of each antenna element and determining antenna directivity appropriate for transmission and reception. More specifically, a signal received by each antenna element is multiplied by an appropriate weight to obtain a receiving directivity pattern of the entire array antenna. The transmission signal is then multiplied by an appropriate weight of each antenna element and then transmitted from the respective antenna element. A transmission directivity pattern as the entire array antenna is thus controlled. The array antenna may work as a sector antenna in which a main lobe of the antenna is directed to a desired direction with a low-level side lobe directed to an undesired direction so that no radio wave is transmitted in the undesired direction. In another method, the main lobe of the antenna is directed to a desired mobile station and a null lobe of the antenna is directed to an interfering mobile station so that a signal-to-interference and noise power ratio (SINR) is increased.

Multi-input and multi-output (MIMO) communication also draws attention as another example of wireless communication techniques employing the multi-antenna. The MIMO communication provides a spatial multiplexed stream by arranging a plurality of antenna elements in each of a receiver side and a transmitter side. The transmitter side multiplexes transmission data by spatial coding and time coding a plurality units of transmission data, and sending the transmission data units to a plurality of transmitting antenna elements to transmit the transmission data units via channels. The receive side then spatial decoding and time decoding signals received via a plurality of receiving antenna elements via the channels, demultiplexes the decoded signals into a plurality of units of data, and thus obtains the original data in a manner free from crosstalk between streams. Without widening the frequency band, the MIMO communication method increases a capacity of transmission in response to the number of antenna elements and increases the communication speed. Since spatial multiplexing is used, frequency utilization is high. The MIMO communication method takes advantage of channel characteristics and is different from a mere transmission and reception adaptive array. For example, the IEEE802.11n standard as an expanded version of the IEEE802.11 standard adopts the OFDM_MIMO communication method.

When a radio frequency (RF) signal passes through an RF transmitter circuit or an RF receiver circuit in the multi-antenna system, an imbalance in phase and amplitude between antenna branches appears as the effect of individual variations in an active element and a component, such as an amplifier, a frequency converter, or the like, forming the RF transmitter circuit or the RF receiver circuit, regardless of the type of multi-antenna technique. The effect of individual variations is particularly great in an automatic gain control (AGC) circuit in the RF receiver circuit and a power amplifier (PA) in the RF transmitter circuit. The imbalance in phase and amplitude between branches leads to degradation in antenna characteristics of the adaptive array, and may result in a directivity completely different from an intended directivity. The imbalance in phase and amplitude between branches in the MIMO communication causes an erratic channel recognition, and a failure in the acquisition of appropriate transmission channel forming row and column. Decoding characteristics on the receiver side are thus substantially degraded.

A calibration process is performed to equalize characteristics between the RF transmitter circuit and the RF receiver circuit in order to control the effect of imbalance in phase and amplitude. The calibration process is typically performed in the frequency domain. In each branch, a calibration coefficient is multiplied on a per sub-carrier basis in the frequency domain.

A communication system handling a wide-band signal acquires the calibration coefficient for each frequency band in use. For example, the OFDM system divides a wide-band signal into a plurality of sub-carriers using fast Fourier transform (FFT) as previously discussed. In this case, the antenna calibration coefficient is determined on a per sub-carrier basis. A transfer function is acquired through transmission and reception of a packet containing all the sub-carriers, and the antenna calibration coefficient is determined for each sub-carrier.

For example, Japanese Unexamined Patent Application Publication No. 2005-348236 discloses an array antenna transmission apparatus. In accordance with the disclosure, the whole frequency band is divided into a plurality of blocks, and amplitude/phase deviations of the sub-carriers are averaged over all the sub-carriers within one block on the basis of the fact that the deviation of a frequency response between adjacent sub-carriers is small. The array antenna transmission apparatus thus obtains a highly accurate calibration coefficient.

Referring to FIG. 7, the IEEE802.11n standard adopting the OFDM_MIMO communication method contains a total of five packet formats. The five packet formats include (1) Legacy Mode working on the 20 MHz band, (2) HT Mixed Mode working on the 20 MHz band, (3) HT Mixed Mode working on the 40 MHz band, (4) 40M Duplicate Legacy Mode working on the 20 MHz band (lower band) of the 40 MHz band and the 20 MHz band (upper band) of the 40 MHz band in a duplicate fashion, and (5) 40M Duplicate HT Mixed Mode working on the 20 MHz band (lower band) of the 40 MHz band and the 20 MHz band (upper band) of the 40 MHz band in a duplicate fashion. Sub-carriers are different on the frequency axis depending on each of a packet format having signals within the 20 MHz band, a packet format having signals within the whole 40 MHz band, a packet format having signals in the upper band of the 40 MHz band, a packet format having signals in the lower band of the 40 MHz band, and a packet format having signals in each of the upper band and the lower band of the 40 MH band. Five calibration cycles are performed to obtain the calibration coefficients for the five packet formats.

Normal communications are not performed during the calibration operation.

SUMMARY OF THE INVENTION

It is thus desirable to provide a wireless communication apparatus, a wireless communication method and a computer program for performing an antenna calibration process to correct an imbalance in phase and amplitude present between antenna branches of a plurality of antennas.

It is further desirable to provide a wireless communication apparatus, a wireless communication method and a computer program for performing an antenna calibration process to correct an imbalance in phase and amplitude present between antenna branches of a plurality of antennas in a communication system handling a wide-band signal.

It is further desirable to provide a wireless communication apparatus, a wireless communication method and a computer program for performing an antenna calibration process to correct an imbalance in phase and amplitude present between antenna branches of a plurality of antennas in a wide-band communication system, such as an OFDM system, which divides a wide-band signal into a plurality of sub-carriers.

It is further desirable to provide a wireless communication apparatus, a wireless communication method and a computer program for performing an antenna calibration process to correct an imbalance in phase and amplitude present between antenna branches of a plurality of antennas in a communication system, such as the one defined in the IEEE802.11n standard, using a plurality of packet formats different from each other in terms of the sub-carrier placement on the frequency axis.

In a wireless communication system including multiple antennas applied in the communication system handling a wide-band signal, a calibration coefficient is acquired for each frequency band in use. The IEEE802.11n standard adopting the OFDM_MIMO communication method defines the five types of packet formats as illustrated in FIG. 7. The sub-carriers are different on the frequency axis from packet format to packet format. The five calibration cycles are thus performed to acquire the calibration coefficients of all the packet formats. No communications are executed while the calibration operation is in progress. The execution of the five different calibration cycles typically leads to a large overhead, and is thus undesirable.

The IEEE802.11n standard adopting the OFDM_MIMO communication method includes the five packet formats: the Legacy Mode and HT Mixed Mode working on the 20 MHz band, the HT Mixed Mode working on the 40 MHz band, and the two modes working on 40 MHz band. Since the sub-carriers are different on the frequency axis depending on the Legacy Modes and HT Mixed Modes working on the 20 and 40 MHz bands, the five calibration cycles are typically performed to acquire the calibration coefficients of these packet formats. The execution of the five different calibration cycles leads to a large overhead, and is thus undesirable.

According to one embodiment of the present invention, a wireless communication apparatus includes a plurality of antenna branches for transmitting and receiving a wireless communication signal, a calibration coefficient calculator for calculating a calibration coefficient for each frequency band, the calibration coefficient correcting an imbalance in phase and amplitude existing between the antenna branches, a coefficient storage memory for storing the calibration coefficient calculated for each frequency band, a calibration coefficient reader for reading the calibration coefficient of a frequency band of one of a transmission signal and a reception signal as a target to be calibrated, a calibration coefficient interpolator for interpolating a calibration coefficient of the frequency band if the coefficient storage memory stores no corresponding calibration coefficient of the frequency band of one of the transmission signal and the reception signal, and a calibration coefficient multiplier for multiplying one of the transmission signal and the reception signal by one of the calibration coefficient read from the coefficient storage memory by the calibration coefficient reader and the calibration coefficient interpolated by the calibration coefficient interpolator.

In a multi-carrier communication system supporting a first packet format containing sub-carriers spread throughout a predetermined wide band and a second packet format containing sub-carriers spread over a portion of the wide band, the calibration coefficient calculator calculates the calibration coefficients on all the sub-carriers in the first packet format, and stores the calculated calibration coefficients on the coefficient storage memory. In the case of the first packet format, the calibration process is performed using the calibration coefficient of the sub-carrier stored on the coefficient storage memory as is for the transmission signal. In the case of the second packet format, the calibration coefficient at the corresponding sub-carrier position, if stored on the coefficient storage memory, is used as is. If a sub-carrier lacks a calibration coefficient, an interpolation process is performed on the calibration coefficient.

More specifically, when the calibration process is performed on one of the transmission signal and the reception signal, each signal complying with the first packet format, the calibration coefficient reader reads from the coefficient storage memory the calibration coefficient responsive to each sub-carrier and the calibration coefficient multiplier multiplies each sub-carrier by the calibration coefficient. On the other hand, when the calibration process is performed on one of the transmission signal and the reception signal, each signal complying with the second packet format, the calibration coefficient multiplier multiplies the sub-carrier by the calibration coefficient read from the coefficient storage memory if the calibration coefficient of the sub-carrier is stored on the coefficient storage memory. The calibration coefficient multiplier multiplies the sub-carrier by the calibration coefficient interpolated by the calibration coefficient interpolator if the calibration coefficient of the sub-carrier is not stored on the coefficient storage memory.

In the multi-carrier communication system in which a plurality of packet formats coexist, it is not necessary to acquire the calibration coefficients for all the sub-carriers of the packet formats. Time to execute the calibration process is shortened, and throughput is increased. The size of a hardware structure for acquiring the calibration coefficients of all the sub-carriers of the packet formats is reduced.

According to one embodiment of the present invention, the calibration coefficient interpolator may interpolate a calibration coefficient in a desired frequency band using a calibration coefficient for a near frequency band stored on the coefficient storage memory, based on continuity of the calibration coefficients on a frequency axis.

According to one embodiment of the present invention, the calibration coefficient interpolator may use, as interpolation values, coefficient initial values of a real number 1.0 and an imaginary number 0.0.

According to one embodiment of the present invention, the calibration coefficient interpolator may determine the calibration coefficient by estimating a characteristic value of a low-pass filter.

According to one embodiment of the present invention, a wireless communication method of a wireless communication apparatus having a plurality of antenna branches for transmitting and receiving a wireless communication signal, includes the steps of calculating a calibration coefficient for each frequency band, the calibration coefficient correcting an imbalance in phase and amplitude existing between the antenna branches and storing on a coefficient storage memory the calibration coefficient, reading from the coefficient storage memory the calibration coefficient of a frequency band of one of a transmission signal and a reception signal as a target to be calibrated, interpolating a calibration coefficient of the frequency band if the coefficient storage memory stores no corresponding calibration coefficient of the frequency band of one of the transmission signal and the reception signal, and multiplying one of the transmission signal and the reception signal by one of the calibration coefficient read from the read coefficient storage memory and the interpolated calibration coefficient.

According to one embodiment of the present invention, a computer readable program for causing a computer to perform a wireless communication method of a wireless communication apparatus having a plurality of antenna branches for transmitting and receiving a wireless communication signal, includes the steps of calculating a calibration coefficient for each frequency band, the calibration coefficient correcting an imbalance in phase and amplitude existing between the antenna branches and storing on a coefficient storage memory the calibration coefficient calculated for each frequency band, reading from the coefficient storage memory the calibration coefficient of a frequency band of one of a transmission signal and a reception signal as a target to be calibrated, interpolating a calibration coefficient of the frequency band if the coefficient storage memory stores no corresponding calibration coefficient of the frequency band of one of the transmission signal and the reception signal, and multiplying one of the transmission signal and the reception signal by one of the calibration coefficient read from the read coefficient storage memory and the interpolated calibration coefficient.

The computer program is written in a computer readable form to be executed on the computer. The computer with the computer program installed thereon operates as the wireless communication apparatus described above.

In accordance with embodiments of the present invention, the calibration process is appropriately performed on the antenna branches in the communication system handling the wide-band signal.

In accordance with embodiments of the present invention, the calibration process is appropriately performed on the antenna branches in the communication system that divides a wide-band signal into a plurality of sub-carriers such as in the orthogonal frequency division multiplexing (OFDM) system.

In accordance with embodiments of the present invention, the calibration process is appropriately performed on the antenna branches in the wide-band communication system that uses a plurality of packet formats with the sub-carriers different on a frequency axis as defined in the IEEE802.11n standard.

In accordance with embodiments of the present invention, it is not necessary to acquire the calibration coefficients for all the sub-carriers of the packet formats. Time to execute the calibration process is shortened, and throughput is increased. The size of a hardware structure for acquiring the calibration coefficients of all the sub-carriers of the packet formats is reduced.

In accordance with embodiments of the present invention, calibration coefficients are interpolated in the desired frequency band using the calibration coefficient for the near frequency band stored on the coefficient storage memory, based on continuity of the calibration coefficients on the frequency axis.

In accordance with embodiments of the present invention, the calibration process is performed using as the interpolation values, the coefficient initial values of the real number 1.0 and the imaginary number 0.0 in the case of lack of information of the sub-carrier related to the calibration coefficient.

In accordance with embodiments of the present invention, the calibration process is performed by determining the calibration coefficient through estimating the characteristic value of the low-pass filter in the case of lack of information of the sub-carrier related to the calibration coefficient.

These and other features and advantages of the present invention will be apparent from the following description, the accompanying drawings, and the appended claims.

DESCRIPTION OF THE PREFERRED EMBODIMENTS

The embodiments of the present invention are described below with reference to the drawings.

The present invention relates to a method of performing an antenna calibration process to correct an imbalance in phase and amplitude present between antenna branches in a multi-antenna communication system that performs wireless communications using a plurality of antennas based on MIMO and an adaptive array.

The calibration methods of antenna are divided into an external calibration and an internal calibration (or self-calibration). The external calibration is performed using a calibration transceiver in addition to an adaptive-array-antenna communication apparatus. Upon receiving a reference signal transmitted from each antenna element of the adaptive array antenna, the transceiver re-transmits the reference signal. The adaptive-array-antenna communication apparatus compares the reference signal re-transmitted by the transceiver with the original reference signal, detects variations in the characteristics of the transmission and receiver system including the antenna and the transmission path, and then corrects the variations in the characteristics. In the self-calibration, the communication apparatus itself corrects a transfer function. A reference signal generated in each transmitter system is loopback fed to a receiver system, and the received reference signal is then compared with the original reference signal. Variations in the characteristics of the transmission and receiver system including the antenna and the transmission path are detected and then corrected.

The external calibration is subject to the surrounding environment and the effect of a signal to noise ratio because a calibration antenna is used in addition to the array antenna and the reference signal loopback fed via the transmission path is received. The inventors of this invention thus consider the self-calibration that is performed in a self-contained fashion in the communication apparatus as being desirable.

Figure 1:
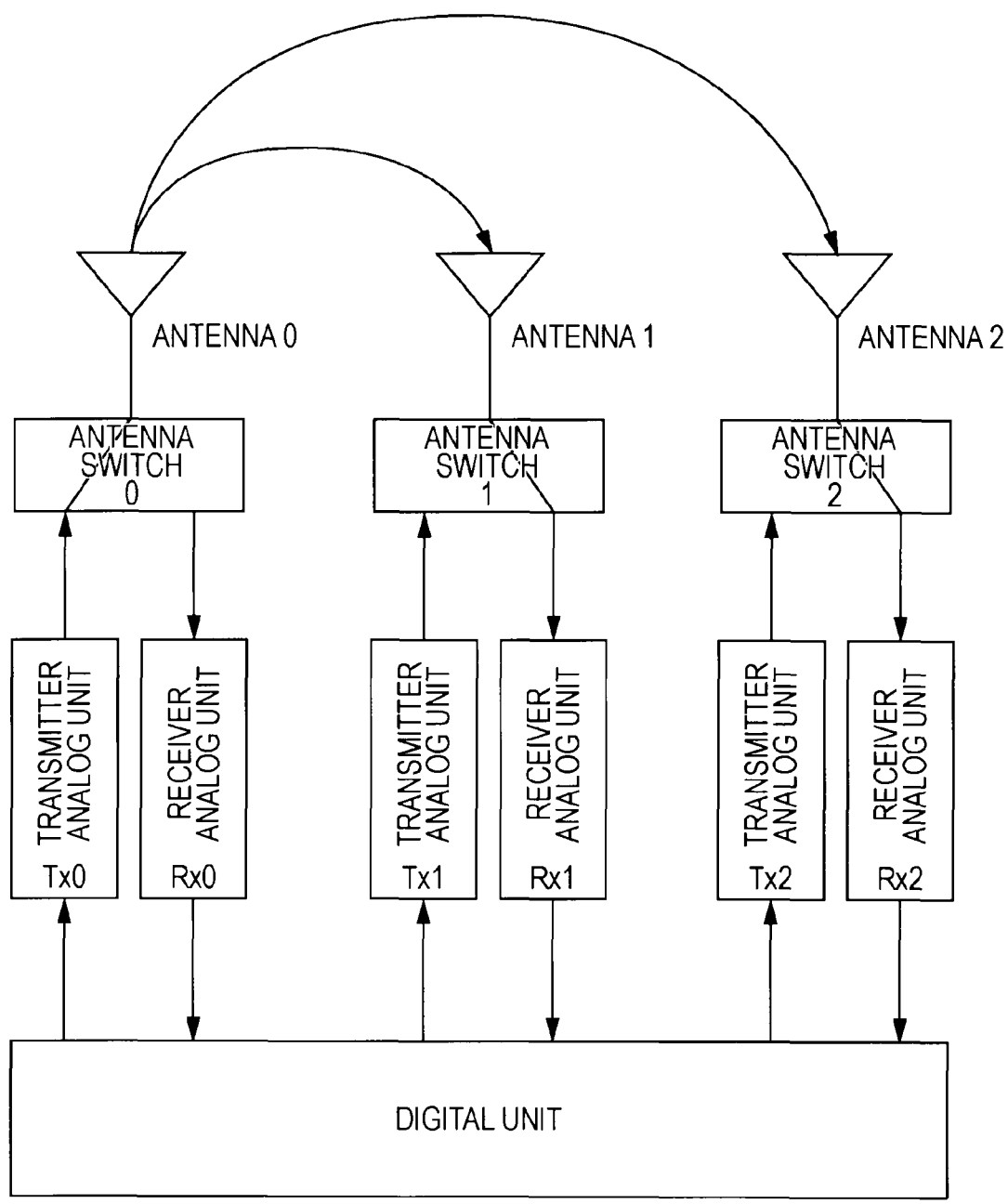
FIG. 1 illustrates a process of determining a calibration coefficient correcting an imbalance in phase and amplitude between branches in accordance with a self-calibration operation in a multi-antenna system.
Figure 2:
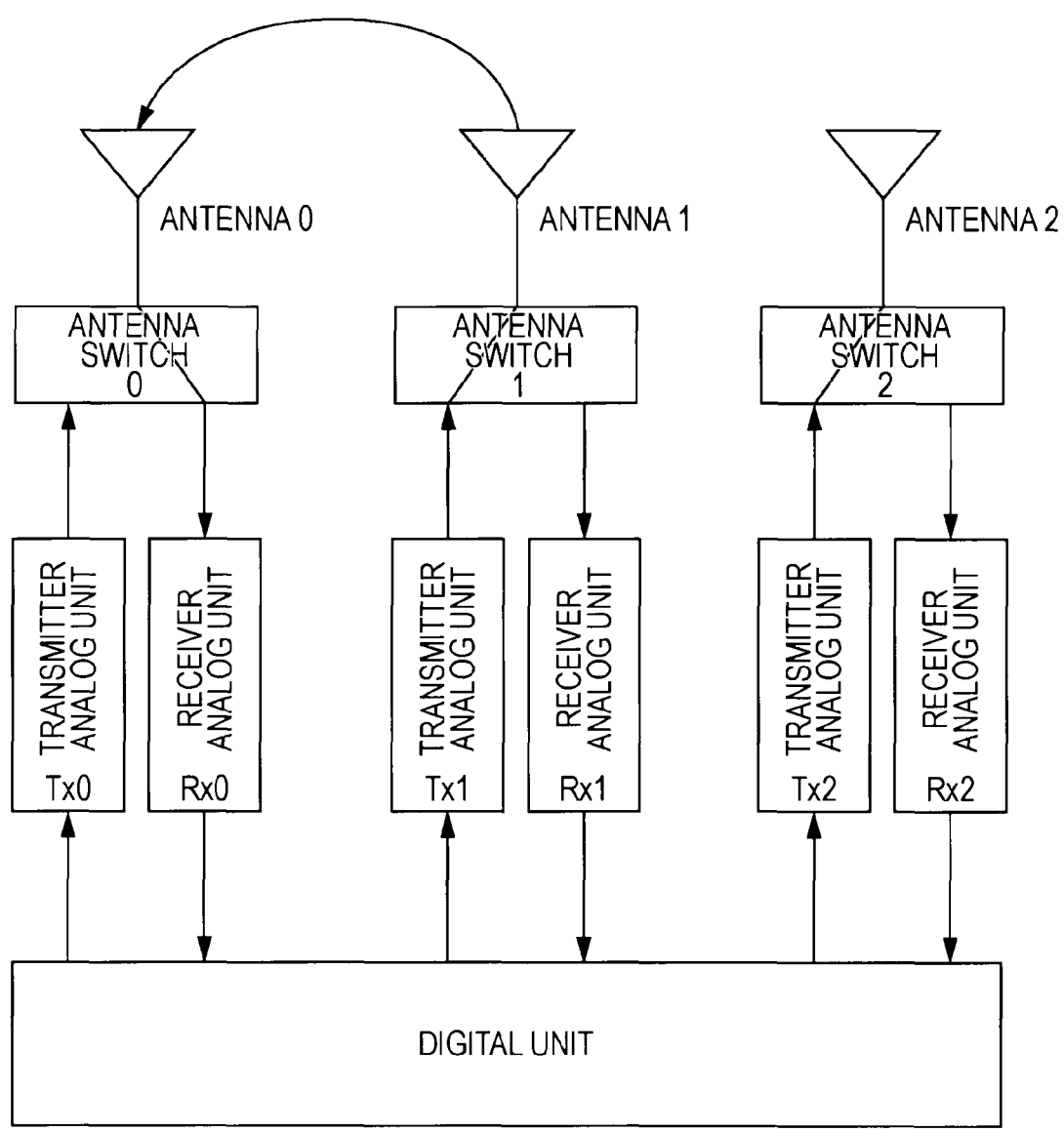
FIG. 2 illustrates a process of determining a correction coefficient correcting an imbalance in phase and amplitude between branches in accordance with self-calibration operation in a multi-antenna system.
Figure 3:
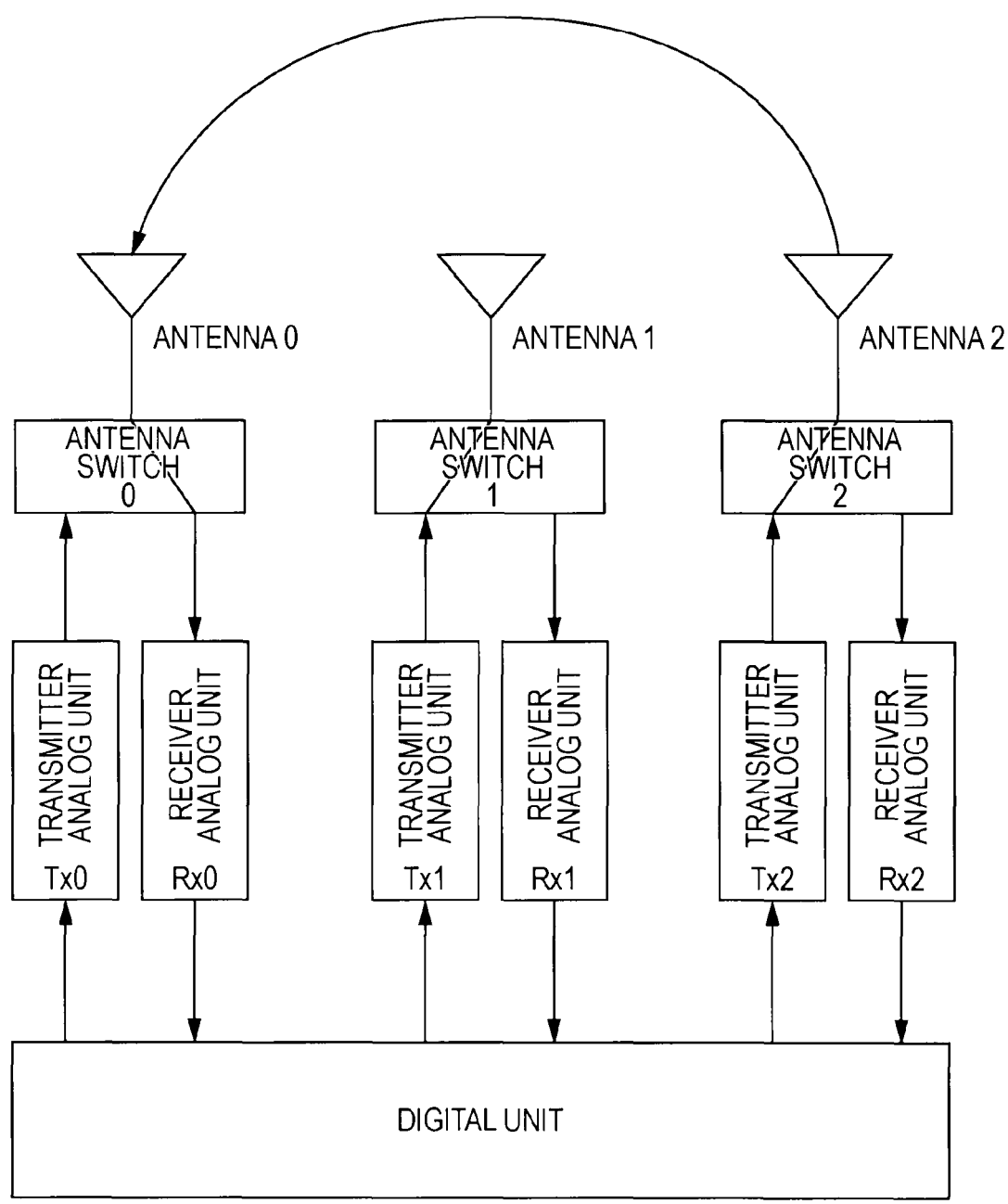
FIG. 3 illustrates a process of determining a correction coefficient correcting an imbalance in phase and amplitude between branches in accordance with self-calibration operation in a multi-antenna system.

FIGS. 1 through 3 illustrate wireless communication apparatuses, each having three transmission and reception branches. A self-calibration process of determining a calibration coefficient correcting an imbalance in phase and amplitude between branches in such a system is described below. Referring to FIGS. 1 through 3, "i" represents a branch number, "Tx(i)" represents a transfer function of a transmitter analog unit belonging to a i-th branch, "Rx(i)" represents a transfer function of a receiver analog unit belonging to the i-th branch, and K(i) represents a calibration coefficient as a correction value of the antenna of each branch.

In the calibration process, a transmission signal of a digital unit is multiplied by the calibration coefficient K(i) in order to correct a transfer function of the transmitter analog unit. The calibration process is completed if the ratio of the transfer function of the transmitter analog unit to the transfer function of the receiver analog unit in each branch remains constant as represented by the following equation (1):

$$\frac{T_x(0) \times K(0)}{R_x(0)} = \frac{T_x(1) \times K(1)}{R_x(1)} = \frac{T_x(2) \times K(2)}{R_x(2)} \quad (1)$$

In the self-calibration process, the calibration coefficient is determined by loopback feeding the reference signal within the communication apparatus having the multi-antenna. Let D(i, j) represent a loopback transfer function obtained through loopback feeding from a transmission branch i to a reception branch j. For example, the self-calibration process is now performed using the zero-th transmission and reception branch as a reference branch. A loopback transfer function along a path of the reference signal from the branch 0 to other branches 1 and 2 and a loopback transfer function along a path of the reference signal loopback fed from the other branch 1 and 2 and received at the branch 0 are determined as represented by the following equations (2):

$$D(0,1) = T_x(0) \times R_x(1)$$

$$D(0,2) = T_x(0) \times R_x(2)$$

$$D(1,0) = T_x(1) \times R_x(0) \quad (2)$$

$$D(2,0) = T_x(2) \times R_x(0)$$

Let the calibration coefficient K(0) at the branch 0 serving as a reference branch be 1.0, and the calibration coefficients of the branches 1 and 2 are expressed as follows:

$$K(0) = 1.0 \quad (3)$$

$$K(1) = \frac{D(0,1)}{D(1,0)} = \left\{\frac{R_x(1)}{T_x(1)}\right\} \times \left\{\frac{R_x(0)}{T_x(0)}\right\}$$

$$K(2) = \frac{D(0,2)}{D(2,0)} = \left\{\frac{R_x(2)}{T_x(2)}\right\} \times \left\{\frac{R_x(0)}{T_x(0)}\right\}$$

Recalculation may be performed to determine whether equation (1) holds. The results show that a calibration condition that the ratio of the transfer function of the transmitter analog unit to the transfer function of the receiver analog unit is constant is satisfied as represented by the following equation (4):

$$\frac{T_x(0) \times K(0)}{R_x(0)} = \frac{T_x(0)}{R_x(0)} \quad (4)$$

$$\frac{T_x(1) \times K(1)}{R_x(1)} = \frac{T_x(0)}{R_x(0)}$$

$$\frac{T_x(2) \times K(2)}{R_x(2)} = \frac{T_x(0)}{R_x(0)}$$

Since the calibration process is performed with respect to the zero-th branch, the calibration coefficient K(0) at the zero-th branch is 1.0 as represented in equation (3). The calibration coefficient K(i) at another branch is a value resulting from being multiplied by (Tx(0)/Rx(0)).

The calibration process is typically executed in the frequency domain. The multiplication by the calibration coefficient K(i) is thus performed on each sub-carrier in each branch in the frequency domain.

In the self-calibration process, a loopback in which the reference signal is transmitted from the reference branch to another branch is referred to as a "forward loopback" and a loopback in which the reference signal loopback fed from the other branch is received at the reference branch is referred to as a "backward loopback."

In the self-calibration process, the calibration coefficient is determined from a loopback transfer function resulting from loopback of a signal within a communication apparatus having a multi-antenna. More specifically, one branch is set up as a reference branch. Then obtained are a forward loopback transfer function of a transmission path from the reference branch to each of the other branch and a backward loopback transfer function of a transmission path from each of the branches other than the reference branch to the reference branch. The calibration coefficient of each of the branches including the reference branch is calculated based on the loopback transfer function. FIG. 1 illustrates a forward loopback established in a wireless communication apparatus including three transmission and reception antennas of branch 0-2. FIGS. 2 and 3 illustrate a backward loopback established in the wireless communication apparatus.

The branches 0-2 include transmitter analog units Tx0-Tx2 and receiver analog units Rx0-Rx2, respectively, and antenna switches 0-2 switch connection to antennas 0-2 at transmission and reception timings of the reference signal. A digital unit performs a digital process on transmission and reception signals in each of the transmission and reception branches.

Each transmitter analog unit performs an radio frequency (RF) process on a converted analog transmission signal, thereby up-converting the transmission signal to an appropriate frequency band, and then outputs the transmission signal from the antenna via the antenna switch into a transmission path. In the case of the MIMO communication, the transmission signal is transmitted into the transmission path from the antenna in a spatial multiplexing fashion. Each receiver analog unit performs an RF process on a wireless signal received from the antenna, thereby down-converting the signal.

Referring to FIGS. 1-3, the branch 0 is set up as a reference branch. More specifically, referring to FIG. 1, the antenna is connected to a transmitter branch in the branch 0 only. In the remaining branches 1 and 2, antennas are connected to receiver branches. The reference signal loopback fed from the branch 0 is received by the other branches 1 and 2. A forward loopback path thus results. The digital unit acquires the forward loopback transfer function.

FIGS. 2 and 3 illustrates a backward loopback path formed. In the backward loopback path, the antenna is connected to the receiver branch in the branch 0 only. The antennas are successively connected to the transmitter branches in the branches 1 and 2. The reference signal transmitted from each of the branches 1 and 2 is loopback received at the branch 0. The digital unit then acquires the backward loopback transfer function.

As illustrated in FIGS. 1-3, the reference signal is output from the antenna to receive the loopback signal. Alternatively, a loopback device may be arranged between branches prior to the antenna switches to loop back the reference signal from the transmitter analog unit to the receiver analog unit. The loopback operation is thus performed along the analog circuits without transmitting the wireless signal from the antenna.

The digital unit performs the digital process on the transmission and reception signal of each of transmission and reception branches 0-2. In accordance with the present embodiment, in the digital process, the forward loopback transfer function and the backward loopback transfer function are acquired from the loopback of the reference signal, and the calibration coefficients K(0)-K(2) correcting transfer functions of the analog units are determined based on the forward loopback transfer function and the backward loopback transfer function. During data transmission, the calibration process satisfying losslessness is executed by multiplying transmission signals to the transmitter branches by the calibration coefficients K(0)-K(2)

Figure 7:
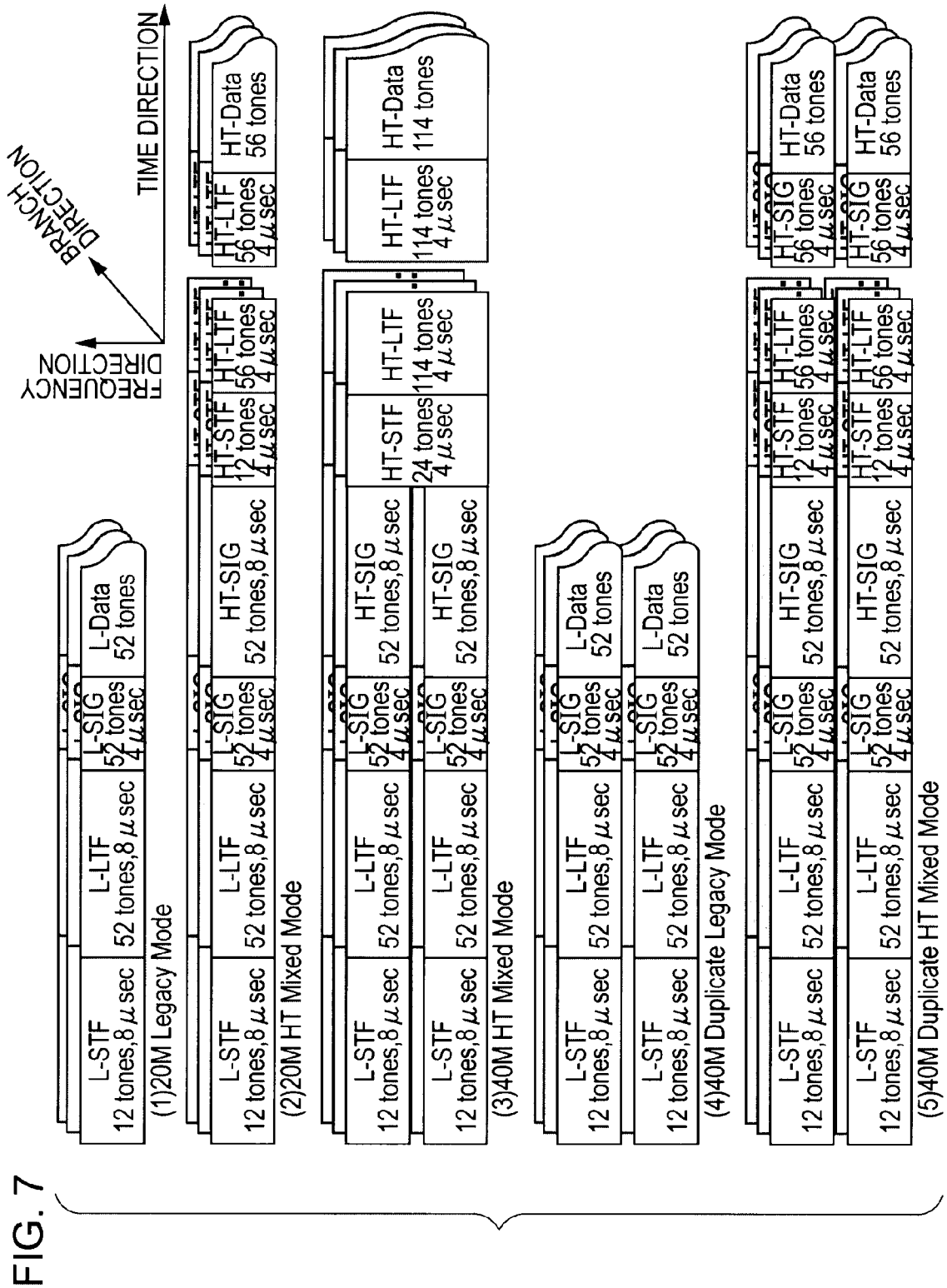
FIG. 7 illustrates packet formats defined by the IEEE801.11n standard.

If the wireless communication apparatus with the multi-antenna is applied to a communication system handling a wide-band signal, the calibration coefficient is acquired for each frequency band in use. In the IEEE801.11n standard adopting the OFDM_MIMO communication method, the five types of packet formats are used (see FIG. 7). Sub-carriers are different on the frequency axis depending on each of a packet format having signals within the 20 MHz band, a packet format having signals within the whole 40 MHz band, a packet format having signals in the upper band of the 40 MHz band, a packet format having signals in the lower band of the 40 MHz band, and a duplicate mode packet having signals in each of the upper band and the lower band of the 40 MH band. Five calibration cycles are performed to obtain the calibration coefficients for the five packet formats. No communications are executed while the calibration operation is in progress. The execution of the five different calibration cycles leads to a large overhead, and is thus undesirable.

In accordance with the present embodiment, the calibration coefficients of all the sub-carriers of the packet format having the signals over the entire 40 MHz band are obtained. In connection with the packet format having the signals within the 20 MHz band, the packet format having the signals within the lower band of the 40 MHz band, and the duplicate mode packet formats having the signals within each of the upper band and the upper band of the 40 MHz band, the calibration coefficients thereof are obtained by interpolating between the calibration coefficients of the near sub-carriers on the frequency axis of the packet formats having the signal over the entire 40 MHz band.

The calibration process time is shorter than the calibration process time in which the calibration coefficients of all the sub-carriers of the packet formats are determined. A high throughput calibration process is thus performed. Since an interpolation process based on the calibration coefficients of near sub-carriers is simple, the scale of a hardware structure for obtaining the calibration coefficients of all the sub-carriers is reduced.

Figure 4:
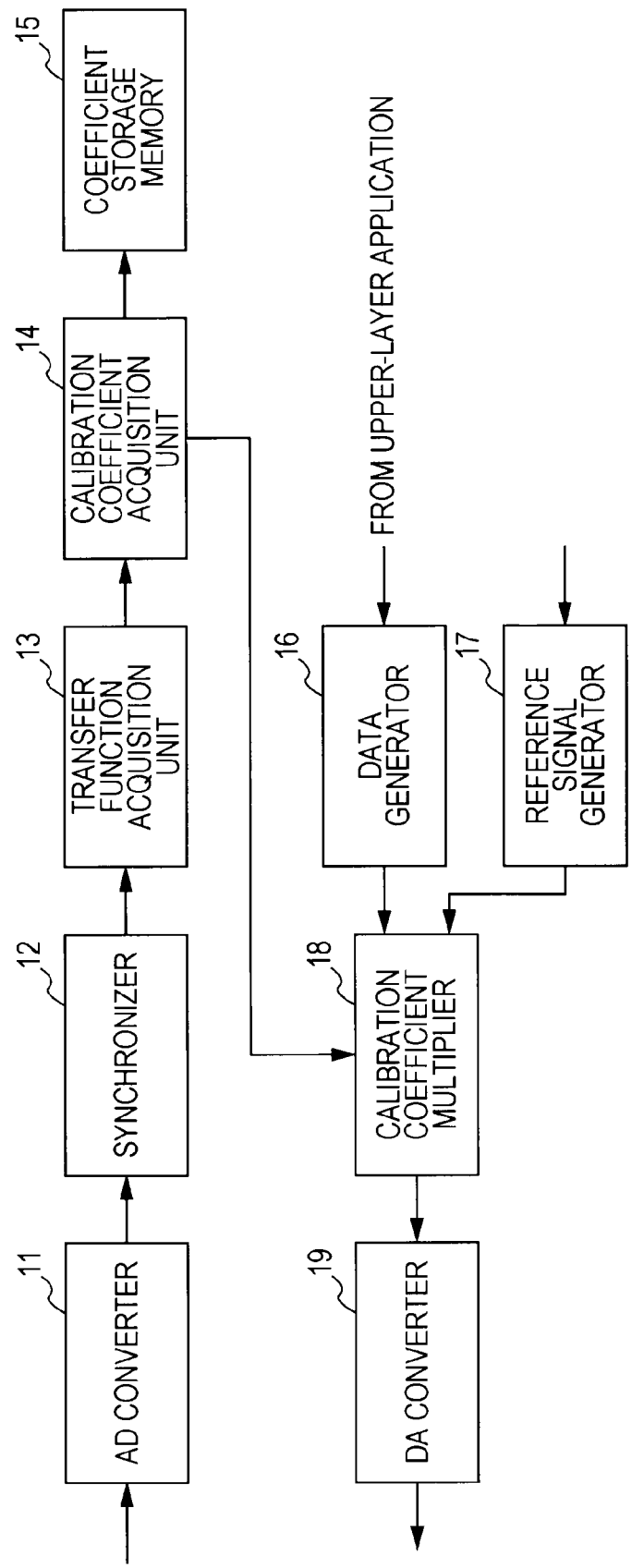
FIG. 4 illustrates an internal structure of a digital section of a wireless communication apparatus illustrated in FIGS. 1 through 3.

FIG. 4 illustrates elements of the digital unit in the wireless communication apparatus illustrated in FIGS. 1-3 mainly performing the calibration process. In the structure illustrated in FIG. 4, the calibration process is performed by a transmitter system.

A receiver system of the digital unit illustrated in FIG. 4 includes an AD converter 11, a synchronizer 12, a transfer function acquisition unit 13, and a calibration coefficient acquisition unit 14.

The AD converter 11 digital-to-analog converts a baseband signal down-converted by the receiver analog unit into a digital signal, and a digital filter (not shown) limits the bandwidth of the digital signal. The synchronizer 12 then detects a packet, establishes synchronization, corrects a frequency offset, and estimates noise. If the OFDM transmission method is used, an FFT (fast Fourier transform) processor (not shown) performs an FFT operation through OFDM decoding, thereby converting the signal on the time axis into a signal on the frequency axis. The decoding operation responsive to each sub-carrier is thus performed. The resulting signal is then parallel-serial converted into the original serial signal. A reception series thus results.

In a calibration process phase, the transfer function acquisition unit 13 multiplies the reference signal loopback received from another branch by the corresponding known signal, thereby acquiring the forward loopback transfer function and the backward loopback transfer function between the branches. The calibration coefficient acquisition unit 14 acquires the calibration coefficients K(0)-K(2) of the analog units of each branch using these loopback transfer functions, and then stores the calibration coefficients K(0)-K(2) on the coefficient storage memory 15.

In accordance with the present embodiment, the calibration coefficient acquisition unit 14 acquires the calibration coefficients of all the sub-carriers of the packets having the signals over the entire 40 MHz band. In connection with the packet format having the signals within the 20 MHz band, the packet format having the signals within the lower band of the 40 MHz band, and the duplicate mode packet formats having the signals within each of the upper band and the upper band of the 40 MHz band, the calibration coefficients thereof are obtained by interpolating between the calibration coefficients of the near sub-carriers on the frequency axis of the packet format having the signal over the entire 40 MHz band. The interpolation method of the calibration coefficients is described later.

Referring to FIG. 4, the process of the receiver system in a data reception phase is not directly related to the present invention, and the discussion thereof is omitted here.

The transmitter system of the digital unit includes a data generator 16, a reference signal generator 17, a calibration coefficient multiplier 18, and a DA converter 19.

The data generator 16 sorts transmission data supplied from an upper-layer application to a transmission series in each branch. In the calibration process phase, the reference signal generator 17 generates a reference signal to be loopback received by the branches.

In a data transmission phase, the calibration coefficient multiplier 18 reads the calibration coefficients K(0)-K(2) of each sub-carrier of a packet format in use from the coefficient storage memory 15, and multiplies the transmission signal intended to each transmission branch by the calibration coefficients K(0)-K(2), respectively. The calibration process is thus performed.

If the OFDM transmission method is used, the calibration process is performed in the frequency domain. Each transmission series is serial-parallel converted on a per symbol period basis, with a symbol period rate lower than an information transmission rate. A plurality of pieces of resulting data are assigned sub-carriers. Amplitude and phase are modulated on a per sub-carrier basis. A plurality of sub-carriers are then inverse fast Fourier transformed. Signals arranged on the time axis are thus obtained with orthogonality of the sub-carriers arranged in the frequency domain maintained. After a digital filter (not shown) limits the band width of the signals, the DA converter 19 digital-to-analog converts the signal into an analog signal.

Depending whether the transmitter system is in the data transmission phase or the calibration process phase, the output of the data generator 27 or the output of the reference signal generator 28 is supplied to the DA converter 30 for conversion to the analog signal.

If the transmission signal is multiplied by a calibration coefficient and then transmitted, the calibration coefficient is based on a branch providing a high output to satisfy a transmit spectrum mask. Large gain variations from transmission branch to transmission branch increase power loss due to the multiplication of the calibration coefficient, and are thus outperformed by an RF circuit having small variations.

Figure 5:
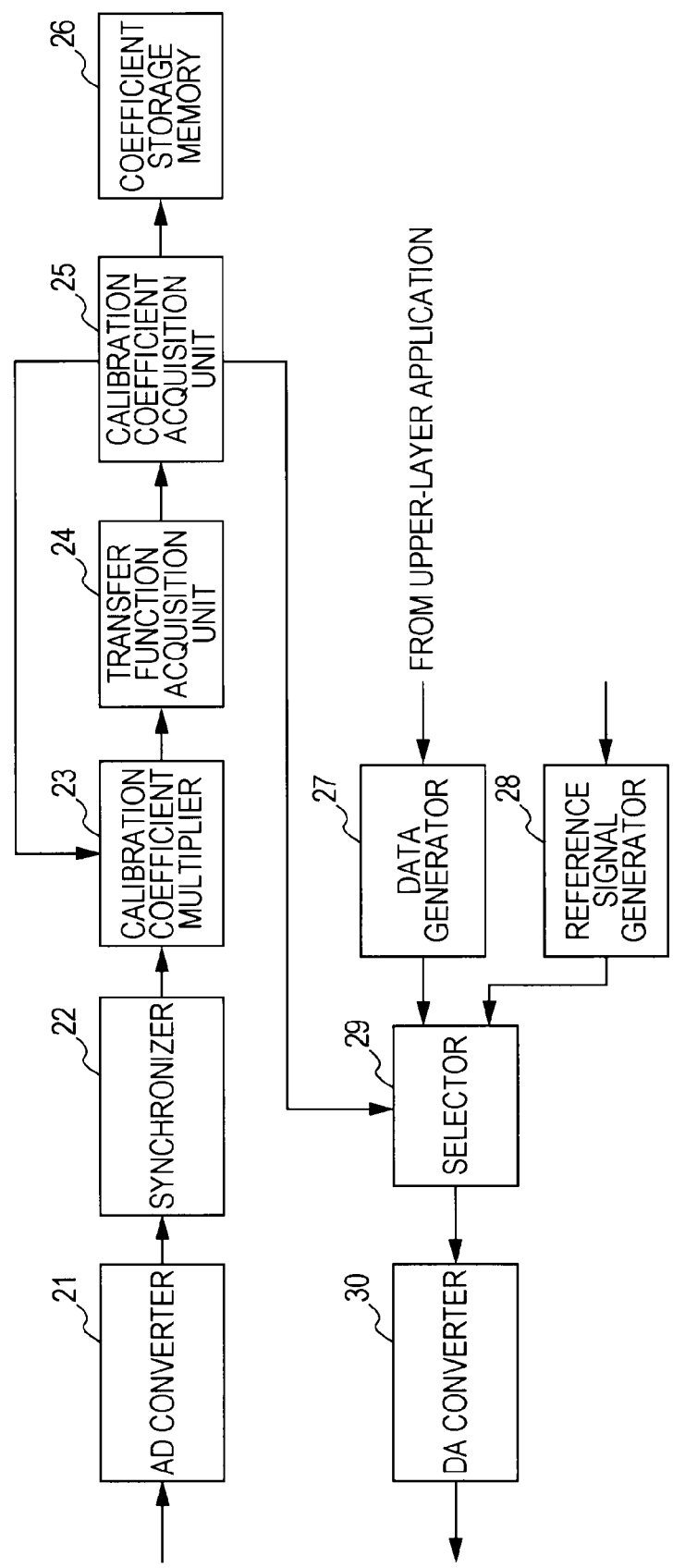
FIG. 5 illustrates an internal structure of a digital section of another wireless communication apparatus illustrated in FIGS. 1 through 3.

FIG. 5 illustrates elements of the digital unit in the wireless communication apparatus illustrated in FIGS. 1-3 mainly performing the calibration process. In the structure illustrated in FIG. 5, the calibration process is performed by a receiver system.

The transmitter system of the digital unit includes a data generator 27, a reference signal generator 28, a selector 29, and a DA converter 30.

The data generator 27, operating in the data transmission phase, sorts transmission data supplied from the upper-layer application to a transmission series on a per branch basis. The reference signal generator 28, operating in the calibration process phase, generates a reference signal to be loopback received by the branches.

Depending on whether the transmitter system is in the data transmission phase or the calibration process phase, the selector 29 connects the DA converter 30 to the data generator 27 or the reference signal generator 28.

If the OFDM transmission method is used, each transmission series is serial-parallel converted on a per symbol period basis, with a symbol period rate lower than an information transmission rate. A plurality of pieces of resulting data are assigned sub-carriers. Amplitude and phase are modulated on a per sub-carrier basis. A plurality of sub-carriers are then inverse fast Fourier transformed. Signals arranged on the time axis are thus obtained with orthogonality of the sub-carriers arranged in the frequency domain maintained. After a digital filter (not shown) limits the band width of the signals, the DA converter 30 digital-to-analog converts the signal into an analog signal.

The receiver system in the digital unit includes an AD converter 21, a synchronizer 22, a calibration coefficient multiplier 23, a transfer function acquisition unit 24, and a calibration coefficient acquisition unit 25.

The AD converter 21 digital-to-analog converts a baseband signal down-converted by the receiver analog unit into a digital signal, and a digital filter (not shown) limits the bandwidth of the digital signal. The synchronizer 22 then detects a packet, establishes synchronization, corrects a frequency offset, and estimates noise. If the OFDM transmission method is used, an FFT processor (not shown) performs an FFT operation through OFDM decoding, thereby converting the signal on the time axis into a signal on the frequency axis. The decoding operation responsive to each sub-carrier is thus performed. The resulting signal is then parallel-serial converted into the original serial signal. A reception series thus results.

In the calibration process phase, the transfer function acquisition unit 24 multiplies the reference signal loopback received from another branch by the corresponding known signal, thereby acquiring the forward loopback transfer function and the backward loopback transfer function between the branches. The calibration coefficient acquisition unit 25 acquires the calibration coefficients K(0)-K(2) of the analog units of each branch using these loopback transfer functions, and then stores the calibration coefficients K(0)-K(2) on the coefficient storage memory 26.

In accordance with the present embodiment, the calibration coefficient acquisition unit 25 acquires the calibration coefficients of all the sub-carriers of the packets having the signals over the entire 40 MHz band. In connection with the packet format having the signals within the 20 MHz band, the packet format having the signals within the lower band of the 40 MHz band, and the duplicate mode packet formats having the signals within each of the upper band and the upper band of the 40 MHz band, the calibration coefficients thereof are obtained by interpolating between the calibration coefficients of the near sub-carriers on the frequency axis of the packet formats having the signal over the entire 40 MHz band. The interpolation method of the calibration coefficients is described later.

The calibration coefficient multiplier 23, operating in the data reception phase, reads from the coefficient storage memory 26 the calibration coefficients K(0)-K(2) of the sub-carriers responsive to the packet format in use, and then multiplies the reception signals of the reception branches by the calibration coefficients K(0)-K(2). The calibration process is thus performed.

Tables below list mapping of the packet formats in the frequency domain. The leftmost column denotes sub-carriers in the frequency domain, ranging from designations −60 to +60.

TABLE 1

| DESIGNATION ON FREQUENCY AXIS | PACKET FORMAT | | | | |
|---|---|---|---|---|---|
| | 40 MHz | 20 MHz | 40M Lower | 40M Upper | Duplicate |
| −60 | | | 0 | | |
| −59 | | | 1 | | |
| −58 | 0 | | 2 | | 0 |
| −57 | 1 | | 3 | | 1 |
| −56 | 2 | | 4 | | 2 |
| −55 | 3 | | 5 | | 3 |
| −54 | 4 | | 6 | | 4 |
| −53 | 5 | | 7 | | 5 |
| −52 | 6 | | 8 | | 6 |
| −51 | 7 | | 9 | | 7 |
| −50 | 8 | | 10 | | 8 |
| −49 | 9 | | 11 | | 9 |
| −48 | 10 | | 12 | | 10 |
| −47 | 11 | | 13 | | 11 |
| −46 | 12 | | 14 | | 12 |
| −45 | 13 | | 15 | | 13 |
| −44 | 14 | | 16 | | 14 |
| −43 | 15 | | 17 | | 15 |
| −42 | 16 | | 18 | | 16 |
| −41 | 17 | | 19 | | 17 |
| −40 | 18 | | 20 | | 18 |
| −39 | 19 | | 21 | | 19 |
| −38 | 20 | | 22 | | 20 |
| −37 | 21 | | 23 | | 21 |
| −36 | 22 | | 24 | | 22 |
| −35 | 23 | | 25 | | 23 |
| −34 | 24 | | 26 | | 24 |
| −33 | 25 | | 27 | | 25 |
| −32 | 26 | | | | |
| −31 | 27 | | 28 | | 26 |

TABLE 2

| DESIGNATION ON FREQUENCY AXIS | PACKET FORMAT | | | | |
|---|---|---|---|---|---|
| | 40 MHz | 20 MHz | 40M Lower | 40M Upper | Duplicate |
| −30 | 28 | | 29 | | 27 |
| −29 | 29 | | 30 | | 28 |
| −28 | 30 | 0 | 31 | | 29 |
| −27 | 31 | 1 | 32 | | 30 |
| −26 | 32 | 2 | 33 | | 31 |
| −25 | 33 | 3 | 34 | | 32 |
| −24 | 34 | 4 | 35 | | 33 |
| −23 | 35 | 5 | 36 | | 34 |
| −22 | 36 | 6 | 37 | | 35 |
| −21 | 37 | 7 | 38 | | 36 |
| −20 | 38 | 8 | 39 | | 37 |
| −19 | 39 | 9 | 40 | | 38 |
| −18 | 40 | 10 | 41 | | 39 |
| −17 | 41 | 11 | 42 | | 40 |
| −16 | 42 | 12 | 43 | | 41 |
| −15 | 43 | 13 | 44 | | 42 |
| −14 | 44 | 14 | 45 | | 43 |
| −13 | 45 | 15 | 46 | | 44 |
| −12 | 46 | 16 | 47 | | 45 |
| −11 | 47 | 17 | 48 | | 46 |
| −10 | 48 | 18 | 49 | | 47 |
| −9 | 49 | 19 | 50 | | 48 |
| −8 | 50 | 20 | 51 | | 49 |
| −7 | 51 | 21 | 52 | | 50 |
| −6 | 52 | 22 | 53 | | 51 |

TABLE 2-continued

| DESIGNATION ON FREQUENCY AXIS | PACKET FORMAT | | | | |
|---|---|---|---|---|---|
| | 40 MHz | 20 MHz | 40M Lower | 40M Upper | Duplicate |
| −5 | 53 | 23 | 54 | | |
| −4 | 54 | 24 | 55 | | |
| −3 | 55 | 25 | | | |
| −2 | 56 | 26 | | | |
| −1 | | 27 | | | |

TABLE 3

| DESIGNATION ON FREQUENCY AXIS | PACKET FORMAT | | | | |
|---|---|---|---|---|---|
| | 40 MHz | 20 MHz | 40M Lower | 40M Upper | Duplicate |
| 0 | | | | | |
| 1 | | 28 | | | |
| 2 | 57 | 29 | | | |
| 3 | 58 | 30 | | | |
| 4 | 59 | 31 | | 0 | |
| 5 | 60 | 32 | | 1 | |
| 6 | 61 | 33 | | 2 | 52 |
| 7 | 62 | 34 | | 3 | 53 |
| 8 | 63 | 35 | | 4 | 54 |
| 9 | 64 | 36 | | 5 | 55 |
| 10 | 65 | 37 | | 6 | 56 |
| 11 | 66 | 38 | | 7 | 57 |
| 12 | 67 | 39 | | 8 | 58 |
| 13 | 68 | 40 | | 9 | 59 |
| 14 | 69 | 41 | | 10 | 60 |
| 15 | 70 | 42 | | 11 | 61 |
| 16 | 71 | 43 | | 12 | 62 |
| 17 | 72 | 44 | | 13 | 63 |
| 18 | 73 | 45 | | 14 | 64 |
| 19 | 74 | 46 | | 15 | 65 |
| 20 | 75 | 47 | | 16 | 66 |
| 21 | 76 | 48 | | 17 | 67 |
| 22 | 77 | 49 | | 18 | 68 |
| 23 | 78 | 50 | | 19 | 69 |
| 24 | 79 | 51 | | 20 | 70 |
| 25 | 80 | 52 | | 21 | 71 |
| 26 | 81 | 53 | | 22 | 72 |
| 27 | 82 | 54 | | 23 | 73 |
| 28 | 83 | 55 | | 24 | 74 |
| 29 | 84 | | | 25 | 75 |

TABLE 4

| DESIGNATION ON FREQUENCY AXIS | PACKET FORMAT | | | | |
|---|---|---|---|---|---|
| | 40 MHz | 20 MHz | 40M Lower | 40M Upper | Duplicate |
| 30 | 85 | | | 26 | 76 |
| 31 | 86 | | | 27 | 77 |
| 32 | 87 | | | | |
| 33 | 88 | | | 28 | 78 |
| 34 | 89 | | | 29 | 79 |
| 35 | 90 | | | 30 | 80 |
| 36 | 91 | | | 31 | 81 |
| 37 | 92 | | | 32 | 82 |
| 38 | 93 | | | 33 | 83 |
| 39 | 94 | | | 34 | 84 |
| 40 | 95 | | | 35 | 85 |
| 41 | 96 | | | 36 | 86 |
| 42 | 97 | | | 37 | 87 |
| 43 | 98 | | | 38 | 88 |
| 44 | 99 | | | 39 | 89 |
| 45 | 100 | | | 40 | 90 |
| 46 | 101 | | | 41 | 91 |
| 47 | 102 | | | 42 | 92 |
| 48 | 103 | | | 43 | 93 |

TABLE 4-continued

| DESIGNATION ON FREQUENCY AXIS | PACKET FORMAT | | | | |
|---|---|---|---|---|---|
| | 40 MHz | 20 MHz | 40M Lower | 40M Upper | Duplicate |
| 49 | 104 | | | 44 | 94 |
| 50 | 105 | | | 45 | 95 |
| 51 | 106 | | | 46 | 96 |
| 52 | 107 | | | 47 | 97 |
| 53 | 108 | | | 48 | 98 |
| 54 | 109 | | | 49 | 99 |
| 55 | 110 | | | 50 | 100 |
| 56 | 111 | | | 51 | 101 |
| 57 | 112 | | | 52 | 102 |
| 58 | 113 | | | 53 | 103 |
| 59 | | | | 54 | |
| 60 | | | | 55 | |

As listed in Tables 1-4, −58 sub-carrier to +58 sub-carrier are included in the 40M HT Mixed Mode packet format with three center sub-carriers, namely, −1, 0, and +1 sub-carriers unused. The 40M HT Mixed mode packet format is thus composed of 114-tone sub-carriers.

The 20M HT Mixed Mode packet format includes −28 sub- to +28 sub-carriers with the center sub-carrier, namely, 0 sub-carrier unused. The 20M HT Mixed Mode packet format is composed of 56-tone sub-carriers.

The packet format having the signals in the lower 20 MHZ band (lower band) of the 40 MHZ band (40M Lower) includes −60 sub-carrier signals to −4 sub-carrier signal with the center sub-carrier, i.e., −32 sub-carrier signal unused. The 40 Lower packet format is thus composed of 56-tone sub-carrier signals. The packet format having the signals in the lower 20 MHZ band (higher band) of the 40 MHZ band (40M Higher) includes 4 sub-carrier signal to 60 sub-carrier signal with the center sub-carrier, i.e., 32 sub-carrier signal unused. The 40 Upper packet format is thus composed of 56-tone sub-carrier signals.

The 40M Duplicate HT Mixed Mode packet format includes −58 sub-carrier signal to 58 sub-carrier signal with −32, −5 to 5, and 32 sub-carrier signals unused. The 40M Duplicate HT Mixed Mode packet format is thus composed of 104-tone sub-carrier signals.

In the multi-antenna communication, the calibration coefficient is acquired for each frequency band in use. In accordance with the present embodiment, the calibration coefficients of all the sub-carriers of the packet format having signals over the entire 40 MHz band are acquired. According to Tables 1-4, in connection with most of the sub-carriers in the packet format having the signals within the 20 MHZ band, the packet format having the signals within the lower band of the 40 MHz band, and the duplicate mode packet format having the signals within each of the upper band and the lower band of the 40 MHz band, the calibration coefficients of the sub-carriers corresponding to those of the packet format having the signals within the 40 MHz band (i.e., sub-carriers on the frequency axis) may be directly used.

However, the sub-carriers and center null vacancy are different depending on the packet format. If the calibration coefficients of all the sub-carriers of the packet format having the signals over the entire 40 MHz band are acquired, the packet formats listed in Table 5 lack information regarding the calibration coefficients of the sub-carriers.

TABLE 5

| PACKET FORMAT | REMARK |
|---|---|
| 20M | LACK OF INFORMATION REGARDING SUB-CARRIERS AT −1 AND +1 |
| 40M Lower | LACK OF INFORMATION REGARDING SUB-CARRIERS AT −60 AND −59 |
| 40M Upper | LACK OF INFORMATION REGARDING SUB-CARRIERS AT +59 AND +60 |
| Duplicate | NO LACK OF INFORMATION |

If the packet format lacks the information regarding the calibration coefficients, calibration coefficients obtained from interpolating between the calibration coefficients of near sub-carriers on the frequency axis are used as described below. This operation is based on the premise that the calibration coefficients of the sub-carriers have continuity. The interpolation operation is performed on the calibration coefficient of a sub-carrier near to a sub-carrier not present on the frequency axis.

TABLE 6

| PACKET FORMAT | REMARK |
|---|---|
| 20M | −1 INTERPOLATED WITH −2 AND +1 INTERPOLATED WITH +2 |
| 40M Lower | −60 INTERPOLATED WITH −58 AND −59 INTERPOLATED WITH −58 |
| 40M Upper | +59 INTERPOLATED WITH +58 AND +60 INTERPOLATED WITH +58 |

Figure 6:
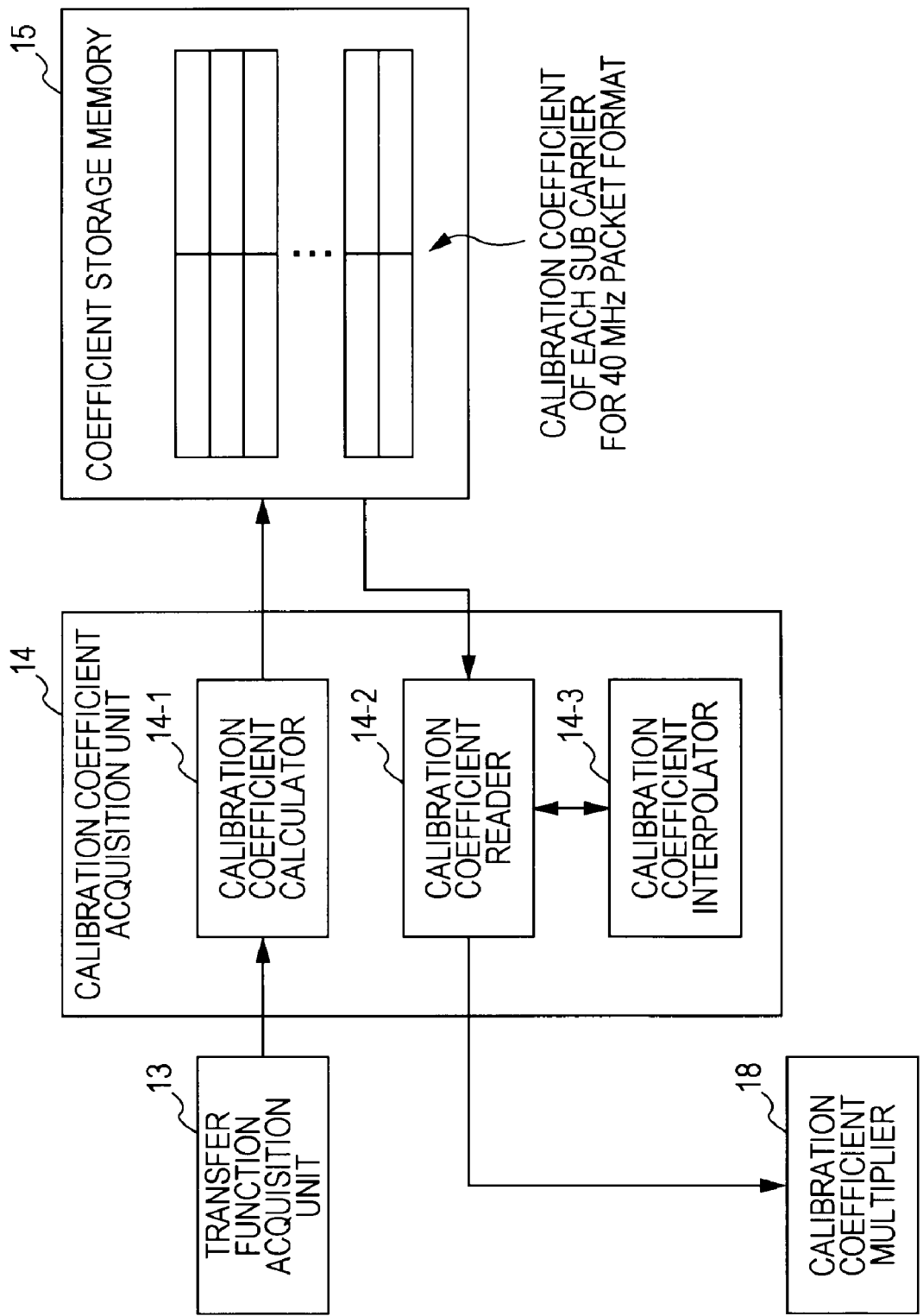
FIG. 6 illustrates a calibration coefficient acquisition unit in the digital section of FIG. 4 performing the above-described process.

FIG. 6 illustrates the calibration coefficient acquisition unit 14 of the digital unit illustrated in FIG. 4 performing the interpolation process. It is noted that the calibration coefficient acquisition unit 25 in the digital unit illustrated in FIG. 5 also performs the same process.

The calibration coefficient acquisition unit 14 includes a calibration coefficient calculator 14-1, a calibration coefficient reader 14-2, and a calibration coefficient interpolator 14-3.

The calibration coefficient calculator 14-1 calculates the calibration coefficients of all the sub-carriers of the packet format having the signals over the entire 40 MHz band, in accordance with the process described with reference to FIGS. 1-3. The calibration coefficient calculator 14-1 then stores the calculated calibration coefficients on the coefficient storage memory 15. The content stored on the coefficient storage memory 15 corresponds to data listed on the second columns from the left on the Tables 1-4.

If the calibration process is performed on the transmission signal (reception signal in FIG. 5) of each branch in the data transmission phase (data reception phase in FIG. 5), the calibration coefficient reader 14-2 retrieves the calibration coefficient at the same designation on the frequency as each sub-carrier, and then sends the calibration coefficient to the calibration coefficient multiplier 18. If no calibration coefficient is present at the position of the same designation on the frequency axis, the calibration coefficient reader 14-2 instructs the calibration coefficient interpolator 14-3 to perform the calibration interpolation process.

With the calibration coefficient reader 14-2, the calibration coefficient interpolator 14-3 reads the calibration coefficient of a sub-carrier close to a sub-carrier on the frequency axis to which the interpolation process is intended (i.e., a sub-carrier lacking information regarding the calibration coefficient). The calibration coefficient interpolator 14-3 interpolates the calibration coefficient at the sub-carrier position request, based on the premise that the calibration coefficients of the sub-carriers have continuity (see Table 6). The calibration coefficient obtained through the interpolation process is supplied to the calibration coefficient multiplier 18 via the calibration coefficient reader 14-2.

The interpolation process is thus performed on the sub-carrier lacking information regarding the calibration coefficient based on the premise that the calibration coefficients has continuity on the frequency axis. Rather than performing the interpolation process, the calibration coefficient interpolator 14-3 may use, as interpolation values, initial coefficient values of a real number 1.0 and an imaginary number 0.0.

In the above-described embodiment, the calibration coefficients of all the sub-carriers of the packet format having the signals over the entire 40 MHz band are acquired. As for the other packet formats, the calibration coefficient at the corresponding sub-carrier position is used as is, and the interpolation process is performed for the sub-carrier lacking the calibration coefficient. Instead of using the packet format having the signals over the entire 40 MHz band, the calibration coefficients of all the sub-carriers of the duplicate mode packet format may be acquired and the same process may be performed.

In the interpolation method that is performed in the case of the lack of the calibration coefficient as listed in Table 6, the calibration coefficient of a near sub-carrier is merely used. The present invention is not limited to such an interpolation method. For example, a linear approximated value may be used. The interpolation method of the calibration coefficient may be determined by estimating a characteristic value of a low-pass filter.

The present application contains subject matter related to that disclosed in Japanese Priority Patent Application JP 2008-189343 filed in the Japan Patent Office on Jul. 23, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus, comprising:
   a plurality of antenna branches for transmitting and receiving a wireless communication signal;
   a calibration coefficient calculator for calculating a calibration coefficient for each frequency band, the calibration coefficient correcting an imbalance in phase and amplitude existing between the antenna branches;
   a coefficient storage memory for storing the calibration coefficient calculated for each frequency band;
   a calibration coefficient reader for reading the calibration coefficient of a frequency band of one of a transmission signal and a reception signal as a target to be calibrated;
   a calibration coefficient interpolator for interpolating a calibration coefficient of the frequency band if the coefficient storage memory stores no corresponding calibration coefficient of the frequency band of one of the transmission signal and the reception signal; and
   a calibration coefficient multiplier for multiplying one of the transmission signal and the reception signal by one of the calibration coefficient read from the coefficient storage memory by the calibration coefficient reader and the calibration coefficient interpolated by the calibration coefficient interpolator.

2. The wireless communication apparatus according to claim 1, wherein in a multi-carrier communication system supporting a first packet format containing sub-carriers spread throughout a predetermined wide band and a second packet format containing sub-carriers spread over a portion of the wide band, the calibration coefficient calculator calculates the calibration coefficients on all the sub-carriers in the first packet format, and stores the calculated calibration coefficients on the coefficient storage memory,
   wherein when a calibration process is performed on one of the transmission signal and the reception signal, each signal complying with the first packet format, the calibration coefficient reader reads the calibration coefficient responsive to each sub-carrier and the calibration coefficient multiplier multiplies the sub-carrier by the calibration coefficient; and
   wherein when the calibration process is performed on one of the transmission signal and the reception signal, each signal complying with the second packet format, the calibration coefficient multiplier multiplies the sub-carrier by the calibration coefficient read from the coefficient storage memory if the calibration coefficient responsive to the sub-carrier is stored on the coefficient storage memory, and the calibration coefficient multiplier multiplies the sub-carrier by the calibration coefficient interpolated by the calibration coefficient interpolator if the calibration coefficient responsive to the sub-carrier is not stored on the coefficient storage memory.

3. The wireless communication apparatus according to claim 1, wherein the calibration coefficient interpolator interpolates a calibration coefficient in a desired frequency band using a calibration coefficient for a near frequency band stored on the coefficient storage memory, based on continuity of the calibration coefficients on a frequency axis.

4. The wireless communication apparatus according to claim 1, wherein the calibration coefficient interpolator uses, as interpolation values, coefficient initial values of a real number 1.0 and an imaginary number 0.0.

5. The wireless communication apparatus according to claim 1, wherein the calibration coefficient interpolator determines the calibration coefficient by estimating a characteristic value of a low-pass filter.

6. A wireless communication method of a wireless communication apparatus having a plurality of antenna branches for transmitting and receiving a wireless communication signal, the wireless communication method comprising the steps of:
   calculating a calibration coefficient for each frequency band, the calibration coefficient correcting an imbalance in phase and amplitude existing between the antenna branches, and storing on a coefficient storage memory the calibration coefficient;
   reading from the coefficient storage memory the calibration coefficient of a frequency band of one of a transmission signal and a reception signal as a target to be calibrated;
   interpolating a calibration coefficient of the frequency band if the coefficient storage memory stores no corresponding calibration coefficient of the frequency band of one of the transmission signal and the reception signal; and
   multiplying one of the transmission signal and the reception signal by one of the calibration coefficient read from the read coefficient storage memory and the interpolated calibration coefficient.

7. A computer readable program embodied on a non-transitory computer readable medium for causing a computer to perform a wireless communication method of a wireless communication apparatus having a plurality of antenna branches for transmitting and receiving a wireless communication signal, the computer program comprising the steps of:

calculating a calibration coefficient for each frequency band, the calibration coefficient correcting an imbalance in phase and amplitude existing between the antenna branches, and storing on a coefficient storage memory the calibration coefficient calculated for each frequency band;

reading from the coefficient storage memory the calibration coefficient of a frequency band of one of a transmission signal and a reception signal as a target to be calibrated;

interpolating a calibration coefficient of the frequency band if the coefficient storage memory stores no corresponding calibration coefficient of the frequency band of one of the transmission signal and the reception signal; and multiplying one of the transmission signal and the reception signal by one of the calibration coefficient read from the read coefficient storage memory and the interpolated calibration coefficient.

* * * * *